United States Patent

Privett

[11] Patent Number: 6,074,591
[45] Date of Patent: Jun. 13, 2000

[54] METHOD OF MAKING AN ENCAPSULATED ELECTRICAL CONNECTOR

[75] Inventor: Franklin D. Privett, Cincinnati, Ohio

[73] Assignee: Connector Manufacturing Company, Hamilton, Ohio

[21] Appl. No.: 09/048,707

[22] Filed: Mar. 26, 1998

[51] Int. Cl.[7] ............................ B29C 45/14; B29C 70/70
[52] U.S. Cl. ...................................... 264/278; 264/272.11
[58] Field of Search ................ 249/176, 64; 264/272.11, 264/272.15, 297.8, 275, 278; 425/577

[56] References Cited

U.S. PATENT DOCUMENTS

| | | | |
|---|---|---|---|
| 2,677,855 | 5/1954 | Mallory | 264/272.11 |
| 3,109,880 | 11/1963 | Newby | 264/272.11 |
| 3,352,958 | 11/1967 | Andrews . | |
| 4,187,272 | 2/1980 | Bourdon et al. | 264/318 |
| 4,298,566 | 11/1981 | Naus et al. | 264/317 |
| 4,622,198 | 11/1986 | Gallusser et al. | 264/318 |
| 5,843,359 | 12/1998 | Kudo et al. | 264/263 |

OTHER PUBLICATIONS

Preformed Line Products catalogue, ©1997—p. 6.
ILSCO catalogue, ©1997—p. 155.

Primary Examiner—Angela Ortiz
Attorney, Agent, or Firm—Kremblas, Foster, Millard & Pollick

[57] ABSTRACT

An electrical connector is encapsulated with a uniform thickness of a transparent insulating material, preferably a clear PVC. The transparent insulating covering permits visual inspection of wires inserted into the connector before tightening the set screws to insure proper installation of the wire. Clarity of the insulating material over the entire connector is achieved by using the injection molding process, which also results in a uniform thickness of the insulating material over the body of the connector as well as cylindrical extensions for the wire and set screw openings.

6 Claims, 5 Drawing Sheets

METHOD OF MAKING AN ENCAPSULATED ELECTRICAL CONNECTOR

BACKGROUND OF THE INVENTION

This invention relates to an encapsulated electrical connector, and specifically to an electrical connector that is covered with a uniform thickness clear or transparent insulating plastic material, such as PVC.

Electrical connectors have been coated with an insulating material, either directly or through the use of a sleeve; however, none of the prior art processes provided a uniform thickness of a clear insulating material on the connector. In one prior art process, a connector is dipped into the plastic material, such as Plastisol™ after the various openings in the connector have been sealed. This process, however, does not result in a uniform thickness of the insulating covering, and when using a clear plastic, it is not always uniformly clear but is occasionally translucent, uneven or includes bubbles. Connectors have also be coated with rubber which has been injection molded onto the part. That coating obviously is not clear.

It would be desirable to produce an electrical connector provided having a clear, injection molded insulating covering of uniform thickness.

SUMMARY OF THE INVENTION

In the present invention, an electrical connector is encapsulated with a uniform thickness of a clear insulating material using the injection molding process.

The connector may take many forms, such as a connector with all connector ports on one side, or a connector with ports on both sides, or a connector with alternating ports from side to side. The wire or conductor may be inserted completely through the body of the connector in some embodiments, or it may be partially inserted from both sides. In all cases, with a clear insulating covering, visual inspection before tightening the set screws insures proper installation of the wire.

It is therefore an object of this invention to provide a novel electrical connector which is encapsulated with a clear insulating material of uniform thickness.

It is another object of this invention to provide a clear covering of uniform minimum thickness on an aluminum electrical connector using the injection molding process.

It is a further object of this invention to provide a method of encapsulating an electrical connector which includes a body member of electrically conductive material, a plurality of wire receiving openings formed in the block member, and plurality of threaded openings formed in the block member and provided with set screws for securing wires inserted into the wire receiving opening, the method comprising the steps of placing a threaded cylindrical mold-pin that is provided with a shoulder of larger diameter than the threaded opening into each threaded opening, with the shoulder in contact with the body member to provide a tight seal, placing a cylindrical mold-pin that is provided with a shoulder of larger diameter than the wire receiving opening into each wire receiving opening, with the shoulder in contact with the body member to provide a tight seal, forming a mold around the connector and mold-pins, and injecting a clear encapsulating material into said mold to form a covering over the body member with each of the openings in the body member being free of encapsulating material but provided with a cylindrical sleeve extending therefrom. It is also an object of this invention to provide an improved electrical connector made by this process.

Other objects and advantages of the invention will be apparent from the following description, the accompanying drawings and the appended claims.

DETAILED DESCRIPTION OF THE INVENTION

Figure 1:
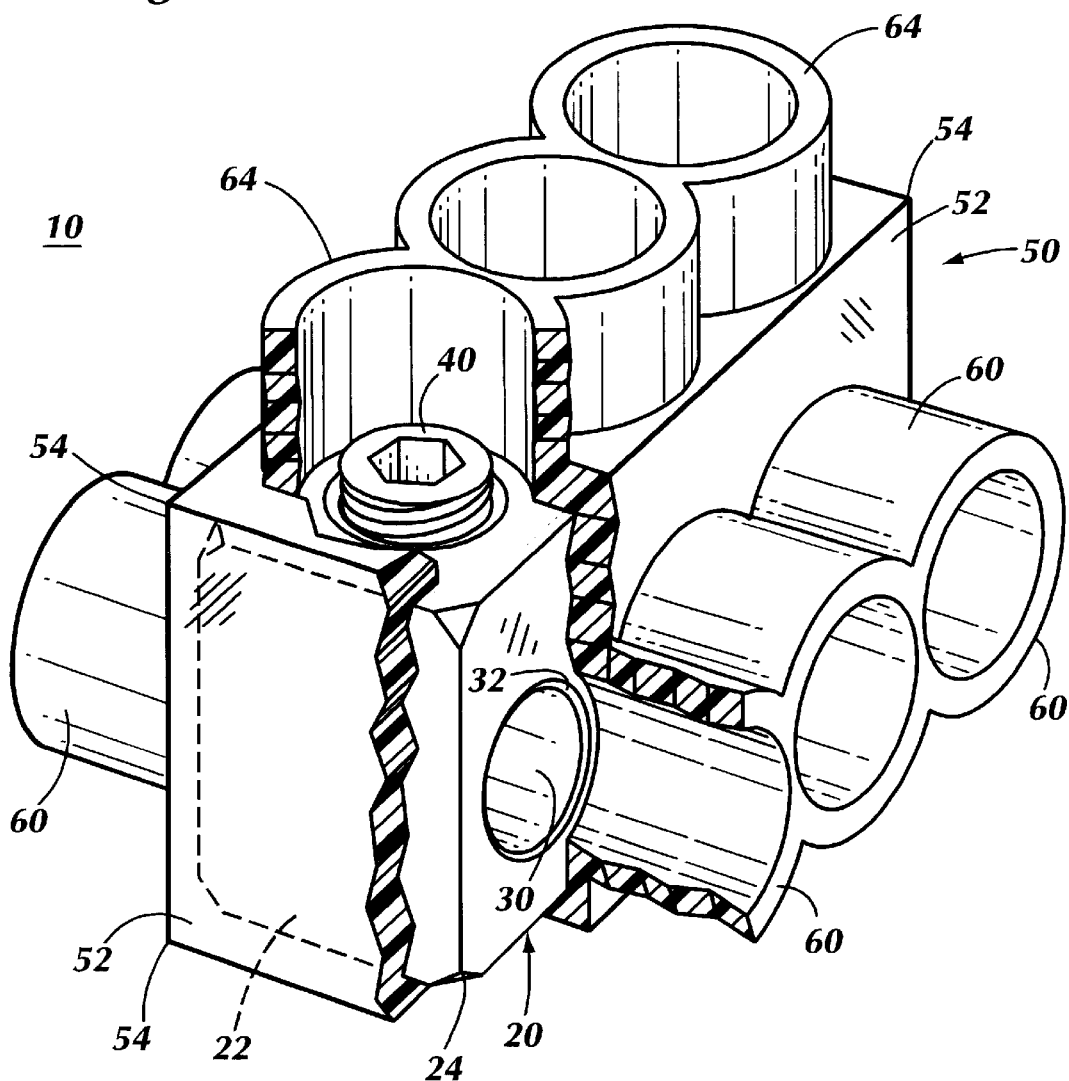
FIG. 1 is a perspective view of an encapsulated electrical connector constructed according to the present invention with a portion of the insulating material shown in cross-section.
Figure 2:
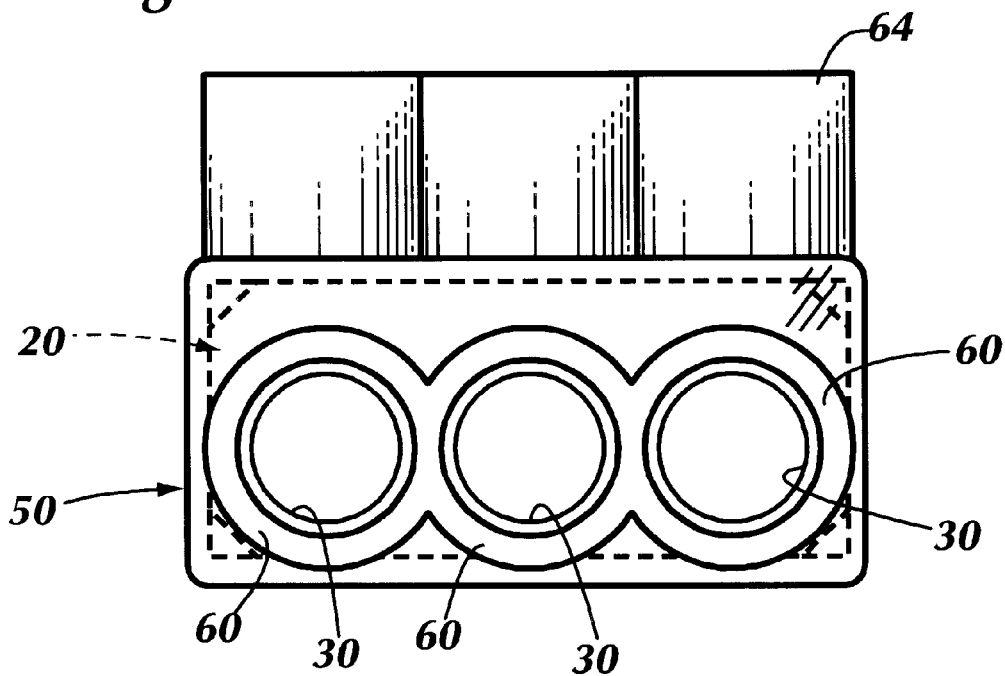
FIG. 2 is a side elevational view of the encapsulated electrical connector of FIG. 1.
Figure 3:
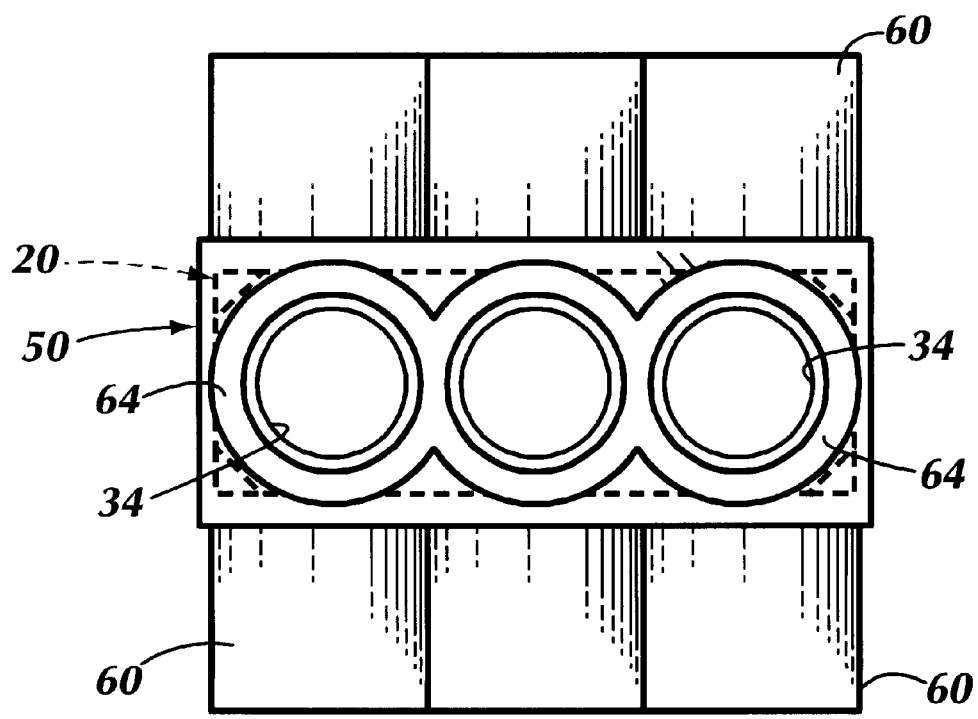
FIG. 3 is a plan view of the encapsulated connector of FIG. 1.
Figure 4:
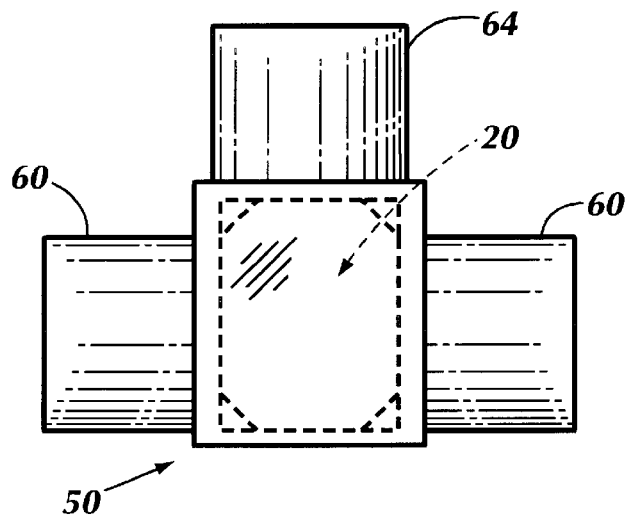
FIG. 4 is an end view of the encapsulated connector of FIG. 1.
Figure 5:
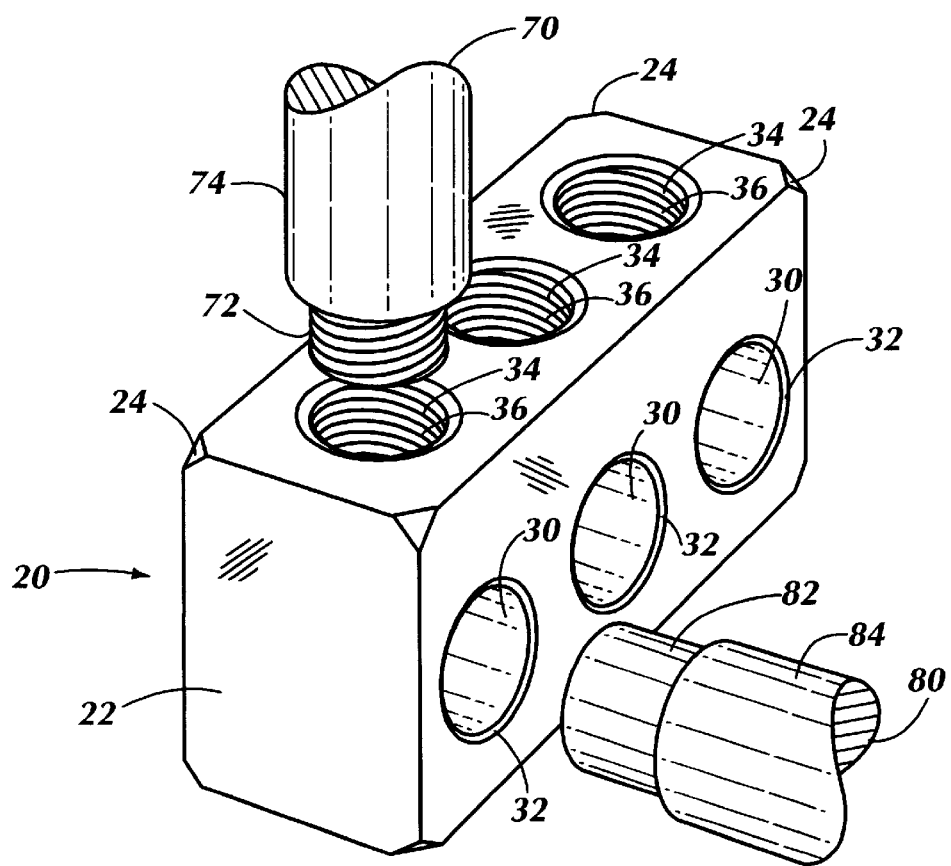
FIG. 5 is a simplified perspective view of a typical electrical connector illustrating one step in the preparation for encapsulation.

Referring now to the drawings, an encapsulated connector 10 includes a body 20 typically formed from a block of aluminum 22, the corners of which are beveled at 24. In one embodiment, the aluminum block is high strength 6061-T6 aluminum alloy, which is suitable for use with either copper or aluminum conductors.

The body 20 includes a plurality of openings 30 into which wires are inserted for electrical connection to each other. The openings are beveled at 32. The openings 30 as shown in the embodiment described herein extend completely through the block 20.

Also formed in the block are openings 34, which are perpendicular to the openings 30. The openings 34 are threaded at 36 to received set screws 40, the purpose of which is to secure wires inserted into the openings 30 into a tight electrical connection within the block 20. While the block 20 shown in the drawings is rectangular, it could take other forms, such as a Z-shaped member, which is typical in the connector industry.

The block 20 is encapsulated with insulating material shown generally at 50. This insulating material, namely a clear PVC, covers the block itself, at 52, and is preferably provided with cylindrical extensions or sleeves 60 that extend outwardly from each of the openings 30, and other extensions or sleeves 64 that extend outwardly from each of the set screw openings 34.

As shown in the drawings, the encapsulating material 50 has a uniform minimum thickness surrounding the connector 20. As a matter of fact, even the corners of the encapsulating material at 54 opposite the corners 24 of the block are made square to insure that the insulating material is maintained at a uniform and minimum thickness. This is possible because the encapsulating material, as will be explained, is injection molded onto the connector 20, as opposed to prior art encapsulated connectors where the encapsulating material is formed on the connector by dipping.

The sleeves 60 and 64 also have a minimum thickness which is maintained uniform throughout their length. The inside diameter of the sleeves 60 and 64 is slightly larger than the openings 30 and 34 in order to provide free access by the wires or conductors to the connector itself without interference by the encapsulating material.

Referring now to FIGS. 5–8, the process by which the connector 20 is encapsulated will be described.

A mold-pin 70 is inserted into each of the set screw or threaded openings 34. As shown, the threaded end 72 of the mold-pin extends into the opening 34, but does not extend as far down as to extend beyond the lower edge of the opening. The diameter of the shaft 34 is larger than the opening 34 in order to provide room for the set screw 40 to be installed later on. There are two types of mold-pins used in preparation of the connector for encapsulation. The first is threaded mold-pin 70 which is provided with a threaded end which matches the threads in the openings 34. The second type of mold-pin 80 is provided with a smooth end 82 which has the same diameter approximately as the openings 30, a first diameter 84 which is larger than the opening 30 and bevel 32, and second step or larger diameter 86 which defines the end of the sleeves 60.

The mold-pins 80 are made part of the die 90, as will be explained.

Figure 6:
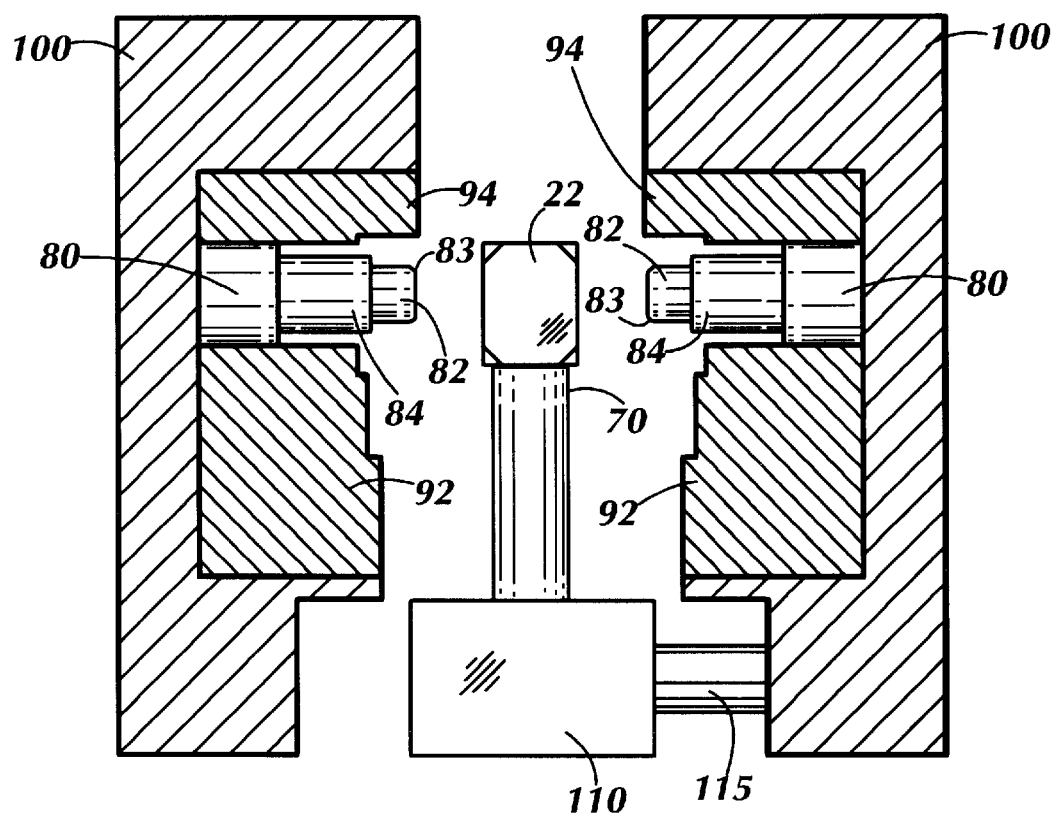
FIG. 6 is an cross-sectional end view showing an electrical connector installed on an ejector in a molding machine with the mold open.

In operation, the threaded mold-pins 70 are installed in each of the set screw openings 34, and then the pins 70 are installed on an injector plate 110, which is part of an injection molding machine, as shown in FIG. 6.

Figure 7:
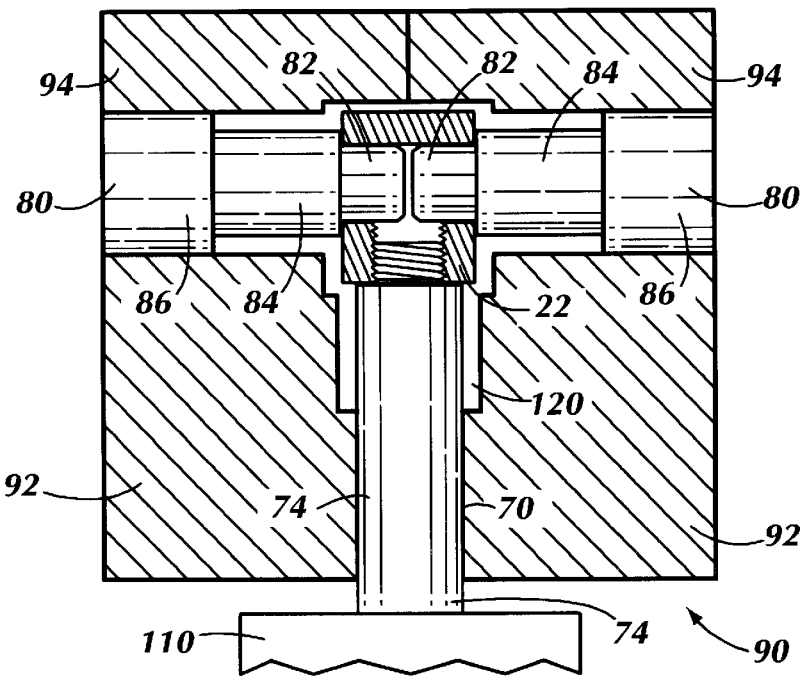
FIG. 7 is an cross-sectional end view of a closed mold, a cross-sectional view of the electrical connector in the mold, and the mold-pins in elevation, the mold being ready to receive the encapsulation material.
Figure 8:
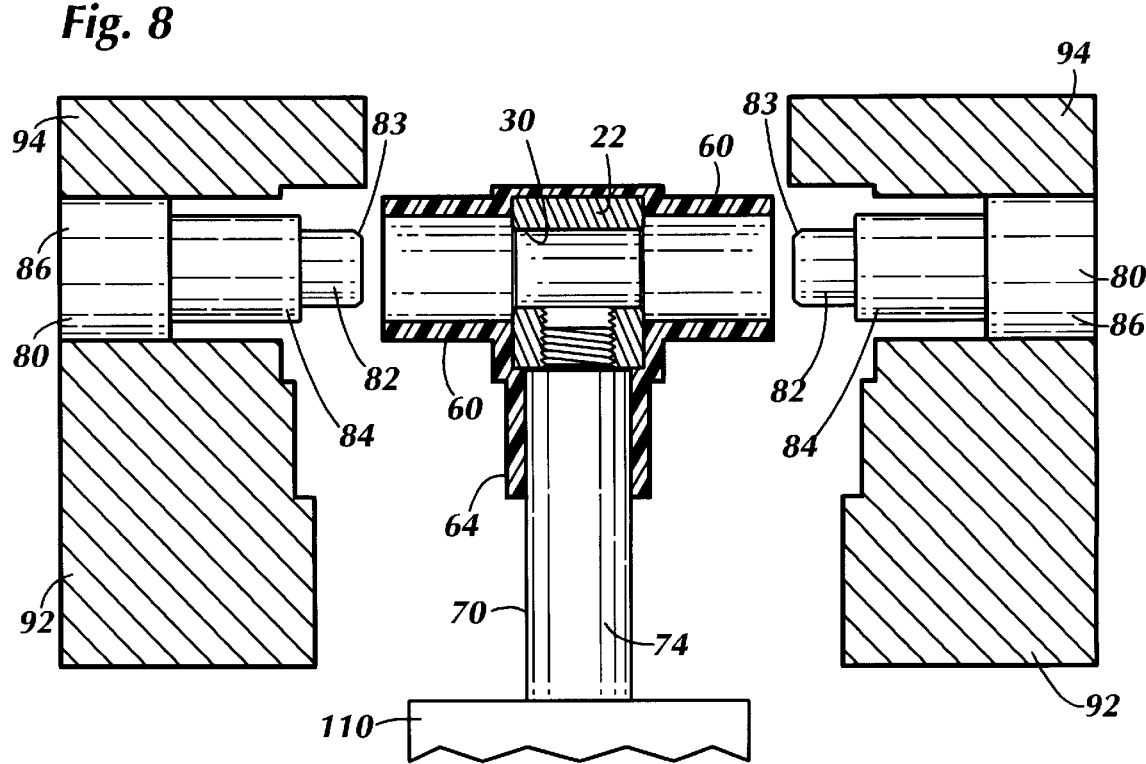
FIG. 8 is an end cross-sectional view showing a part of the mold separated and the electrical connector encapsulated.

The mold-pins 80 will be inserted into the connector 20 at the same time as the die is closed, at least in the embodiment shown in FIGS. 6–8. In FIG. 6, the mold is held open, and the connector, along with the mold-pin 70, is installed on the injector plate 110. A mold-pin 80 for each of the wire receiving openings in the connector body 22 is positioned to be inserted, and is made part of the die itself Thus, the small end 82 will be inserted into the openings 30, facilitated by a bevel 83 at the end of the pin, and the bevel 32 at the edge of the openings 30.

As shown in FIG. 7, once the die has closed, a shoulder that is formed between the small diameter portion of the mold-pin and the larger diameter 84 of the mold-pin is placed in direct contact with the body of the connector. A second shoulder is formed between the intermediate diameter 84 part of the mold-pin and the larger diameter 86 forms the end of the sleeve 60. The space 120 formed from the die components 92 and 94, the connector 22, and the mold-pins 70 and 80 determines the amount of encapsulating material, such as PVC, which will form around the connector.

As shown in FIG. 8, the connector is shown in cross section, as are the die components 92 and 94, however, the mold-pins 70 and 80 are shown in elevation for illustration purposes. After the encapsulating material has been injected, and has hardened, then the die components are separated, as shown in FIG. 8, and the injector plate 110 is forced away from the right hand die member by means of pressure applied through the shaft 115 shown in FIG. 6.

The operator will then lift off the molded or encapsulated connector, and insert a new connector, as shown in FIG. 6 in preparation for the next molding cycle. The mold-pin 70 will then be unscrewed from the connector, thus completing the fabrication of the part. A new connector is then selected, and mold-pins 70 are installed preparatory to the next molding cycle.

While the method and the form of apparatus herein described constitutes a preferred embodiment of this invention, it is to be understood that the invention is not limited to this precise form of apparatus or method and that changes may be made therein without departing from the scope of the invention, which is defined in the appended claims.

What is claimed is:

1. In a method of encapsulating an electrical connector which includes a body member of electrically conductive material, a plurality of wire receiving openings formed in the body member, and a plurality of threaded openings formed in the body member and provided with set screws for securing wires inserted into the wire receiving openings, the method comprising the steps of placing a threaded cylindrical mold-pin that is provided with a shoulder of larger diameter than the threaded opening into each threaded opening of the connector, with the shoulder in contact with the body member to provide a tight seal, placing a cylindrical mold-pin that is provided with a shoulder of larger diameter than the wire receiving opening into each wire receiving opening of the connector, with the shoulder in contact with the body member to provide a tight seal, and providing a mold around the body member and mold-pins, p1 the improvement comprising injecting an encapsulating material into said mold to form a transparent covering over the body member with each of the openings in the body member being free of encapsulating material but provided with a cylindrical sleeve extending therefrom.

2. In the method of claim 1 wherein said encapsulating material is a clear PVC.

3. A method of encapsulating an electrical connector which includes a body member of electrically conductive material, a plurality of wire receiving openings formed in the body member, and a plurality of threaded openings formed in the body member and provided with set screws for securing wires inserted into the wire receiving openings, the method comprising the steps of placing a threaded cylindrical mold-pin that is provided with a shoulder of larger diameter than the threaded opening into each threaded opening of the connector, with the shoulder in contact with the body member to provide a tight seal, installing the threaded cylindrical mold-pin on an injector plate of an injection molding machine, forming a die that conforms to the shape of the electrical connector, positioning a cylindrical mold-pin in the die, placing a cylindrical mold-pin that is provided with a shoulder of larger diameter than the wire receiving opening into each wire receiving opening of the connector, with the shoulder in contact with the body member to provide a tight seal, as the die is closed, and injecting an encapsulating material into said mold to form a transparent covering over the body member with each of the openings in the body member being free of encapsulating material but provided with a cylindrical sleeve extending therefrom.

4. In the method of claim 1 wherein said transparent covering has a uniform minimum thickness.

5. In the method of claim 3 wherein said transparent covering has a uniform minimum thickness.

6. In the method of claim 3 wherein said encapsulating material is a clear PVC.

* * * * *